(12) United States Patent
Flynn (10) Patent No.: US 12,536,705 B2
(45) Date of Patent: Jan. 27, 2026

(54) CONCATENATION OF CHUNKED ENTROPY STREAMS

(71) Applicant: APPLE INC., Cupertino, CA (US)

(72) Inventor: David Flynn, Darmstadt (DE)

(73) Assignee: Apple Inc., Cupertino, CA (US)

( * ) Notice: Subject to any disclaimer, the term of this patent is extended or adjusted under 35 U.S.C. 154(b) by 289 days.

(21) Appl. No.: 18/256,555

(22) PCT Filed: Dec. 10, 2021

(86) PCT No.: PCT/US2021/062949
§ 371 (c)(1),
(2) Date: Jun. 8, 2023

(87) PCT Pub. No.: WO2022/125985
PCT Pub. Date: Jun. 16, 2022

(65) Prior Publication Data
US 2024/0070921 A1    Feb. 29, 2024

Related U.S. Application Data (60) Provisional application No. 63/123,879, filed on Dec. 10, 2020.

(51) Int. Cl.
*G06T 9/00* (2006.01)
*H04N 19/597* (2014.01)
*H04N 19/91* (2014.01)

(52) U.S. Cl.
CPC ............ *G06T 9/00* (2013.01); *H04N 19/597* (2014.11); *H04N 19/91* (2014.11)

(58) Field of Classification Search
CPC .............................. H04N 19/59; H04N 19/91
See application file for complete search history.

(56) References Cited

U.S. PATENT DOCUMENTS

| 9,128,951 | B1* | 9/2015 | Agrawal | G06F 16/1752 |
| 9,477,677 | B1* | 10/2016 | Wang | G06F 16/1752 |
| 11,398,833 | B2 | 7/2022 | Flynn et al. | |
| 2007/0162568 | A1 | 7/2007 | Gupta et al. | |

(Continued)

FOREIGN PATENT DOCUMENTS

WO    WO 2013/107906    7/2013

OTHER PUBLICATIONS

Flynn et al. "CE13.10 report on checked entropy streams," ISO/IEC JCTC1/SC29/WG11 MPEG/m52514, Brussels, Belgium, Jan. 2020, 3 pages.

(Continued)

*Primary Examiner* — Kee M Tung
*Assistant Examiner* — Khoa Vu
(74) *Attorney, Agent, or Firm* — Fish & Richardson P.C.

(57) ABSTRACT

In an example method, a first data stream and a second data stream are obtained. Each of the first data stream and the second data stream includes one or more chunks. Further, a third data stream is generated. The third data stream includes the first data stream and the second data stream. Generating the third data stream includes inserting, in the third data stream, at least a portion of a first chunk of the second data stream between a beginning and an end of a second chunk of the first data stream. Further, the third data stream is provided for transmission or storage.

9 Claims, 10 Drawing Sheets

(56) References Cited

U.S. PATENT DOCUMENTS

| | | |
|---|---|---|
| 2015/0146785 A1 | 5/2015 | Bates et al. |
| 2016/0062918 A1* | 3/2016 | Androulaki .......... H04L 9/0861 713/193 |
| 2020/0042253 A1* | 2/2020 | Patwardhan .......... G06F 3/0638 |
| 2021/0327150 A1* | 10/2021 | Kwiatkowski ....... H04N 5/9201 |

OTHER PUBLICATIONS

Flynn et al., "G-PCC low latency bypass bin coding," ISO/IEC JCTC1/SC29/WG11 MPEG/m51024, Geneva, Switzerland, Oct. 2019, 4 pages.

* cited by examiner

GOAL: TO INSERT AS MUCH OF STREAM B INTO THE "EMPTY" SPACE OF THE FINAL CHUNK OF STREAM A. ONE CHUNK OF B CAN BE MERGED INTO A.

FIG. 5A

THE REMAINDER OF B IS CONCATENATED

CONCATENATION OF CHUNKED ENTROPY STREAMS

CLAIM OF PRIORITY

This application claims priority under 35 U.S.C. § 371 to International Application No. PCT/US2021/062949, filed on Dec. 10, 2021, which claims priority to U.S. Provisional Patent Application No. 63/123,879, filed on Dec. 10, 2020, the contents of both of which are incorporated herewith in their entirety.

TECHNICAL FIELD

This disclosure relates generally to concatenating data streams, such as chunked entropy streams.

BACKGROUND

Various devices, including but not limited to personal computer systems, desktop computer systems, laptop and notebook computers, tablet or pad device, digital cameras, digital video records, and mobile phones or smart phones, may include software and/or hardware that implement an encoding or decoding process using entropy encoding techniques, such as arithmetic encoding, Huffman coding, etc. For example, a device may include an apparatus (e.g., an integrated circuit (IC), such as a system-on-a-chip (SOC), or subsystem of an IC), that may receive and process digital input from one or more sources and output the processed information, e.g., pictures/frames or regions of a picture/frame, or other information according to one or more processing methods involving entropy-based encoding. As another example, a software program may be implemented on a device that may receive and process digital input from one or more sources and output the processed information according to one or more processing methods that involve entropy-based encoding.

SUMMARY

In an aspect, a method includes obtaining a first data stream and a second data stream, where each of the first data stream and the second data stream includes one or more chunks; generating a third data stream including the first data stream and the second data stream, where generating the third data stream includes inserting, in the third data stream, at least a portion of a first chunk of the second data stream between a beginning and an end of a second chunk of the first data stream; and providing the third data stream for transmission or storage.

Implementations of this aspect can include one or more of the following features.

In some implementations, the first chunk of the second data stream can be positioned at a beginning of the second data stream.

In some implementations, the second chunk of the first data stream can be positioned at an end of the first data stream.

In some implementations, generating the third data stream can include appending, in the third data stream, a remainder of the second data stream to an end of the first data stream.

In some implementations, each of the chunks can include a first sub-stream and a second sub-stream in a sequence.

In some implementations, in the third data stream, at least the portion of the first chunk of the second data stream can be inserted between the first sub-stream and the second sub-stream of the second chunk of the first data stream.

In some implementations, each of the first sub-streams of data can include information compressed using an entropy-based encoder.

In some implementations, each of the second sub-streams of data can include uncompressed information.

In some implementations, at least one of the chunks can have a single sub-stream.

In some implementations, the first data stream and the second data stream can include information regarding a three-dimensional point cloud.

In another aspect, a method includes obtaining a plurality of data streams including a first data stream, a second data stream, and a third data stream, where each of the first data stream, the second data stream, and the third data stream includes one or more chunks; and generating a fourth data stream including the plurality of data streams. Generating the fourth data stream includes (i) removing padding data from one or more of the first data stream, the second data stream, and the third data stream, (ii) subsequent to removing the padding data, concatenating the first data stream, the second data stream, and the third data stream to produce the combined data stream, (iii) shifting, in the fourth data stream, a trailing portion of a first chunk of the second data stream such that in the fourth data stream, a beginning of the first chunk is a fixed interval from an end of the first chunk, and (iv) shifting, in the fourth data stream, a trailing portion of a second chunk of the first data stream such that in the fourth data stream, a beginning of the second chunk is the fixed interval from an end of the second chunk. The method also includes providing the fourth data stream for transmission or storage.

Implementations of this aspect can include one or more of the following features.

In some implementations, each of the chunks can include a first sub-stream and a second sub-stream in a sequence.

In some implementations, generating the fourth data stream can include shifting, in the fourth data stream, the second sub-stream of the first chunk such that a beginning of the first sub-stream of the first chunk is the fixed interval from an end of the second sub-stream of the first chunk.

In some implementations, generating the fourth data stream can include shifting, in the fourth data stream, the second sub-stream of the second chunk such that a beginning of the first sub-stream of the second chunk is the fixed interval from an end of the first sub-stream of the second chunk.

In some implementations, each of the first sub-streams can include information compressed using an entropy-based encoder.

In some implementations, each of the second sub-streams can include uncompressed information.

In some implementations, the first data stream and the second data stream can include information regarding a three-dimensional point cloud.

In another aspect, a method includes obtaining N data streams, where each of the N data streams includes one or more chunks; and generating a combined data stream including the N data streams. Generating the combined data stream includes (i) removing padding data from one or more of the N data streams, (ii) subsequent to removing the padding data, concatenating the N data streams in order from the first data stream to the Nth data stream to produce the combined data stream, and (iii) for each data streams in the combined data stream, in order from the (N−1)th data stream to the first data stream, shifting a portion of a trailing chunk of that data stream such that in the combined data stream, a beginning of the trailing chunk is a fixed interval from an end of the trailing chunk. The method also includes providing the combined stream of data for transmission or storage.

Implementations of this aspect can include one or more of the following features.

In some implementations, the N data streams can include a first data stream, a second data stream, and a third data stream. Generating the combined data stream can include (i) shifting a portion of a trailing chunk of the second data stream such that in the combined data stream, a beginning of the trailing chunk of the second data stream is the fixed interval from an end of the trailing chunk of the second data stream, and (ii) subsequent to shifting the portion of the trailing chunk of the second data stream, shifting a portion of a trailing chunk of the first data stream such that in the combined data stream, a beginning of the trailing chunk of the first data stream is the fixed interval from an end of the trailing chunk of the first data stream.

In some implementations, each of the chunks can include a first sub-stream and a second sub-stream in a sequence.

In some implementations, each of the first sub-streams can include information compressed using an entropy-based encoder.

In some implementations, each of the second sub-streams can include uncompressed information.

In some implementations, the plurality of data streams can include information regarding a three-dimensional point cloud.

In another aspect, a method includes obtaining a plurality of data streams including a first data stream, a second data stream, and a third data stream, where each of the first data stream, the second data stream, and the third data stream includes one or more chunks; and generating a fourth data stream including the plurality of data streams. Generating the fourth data stream includes (i) removing padding data from one or more of the first data stream, the second data stream, and the third data stream, (ii) subsequent to removing the padding data, concatenating the first data stream, the second data stream, and the third data stream to produce the combine data stream, (iii) bit-wise swapping, in the fourth data stream, a trailing portion of a first chunk of the second data stream with at least a portion of the third data stream such that in the fourth data stream, a beginning of the first chunk is a fixed interval from an end of the first chunk, and (iv) bit-wise swapping, in the fourth data stream, a trailing portion of a second chunk of the first data stream with at least a portion of the second data stream such that in the fourth data stream, a beginning of the second chunk is the fixed interval from an end of the second chunk. The method also includes providing the fourth data stream for transmission or storage.

Implementations of this aspect can include one or more of the following features.

In some implementations, each of the chunks can include a first sub-stream and a second sub-stream in a sequence.

In some implementations, generating the fourth data stream can include bit-wise swapping, in the fourth data stream, the second sub-stream of the first chunk with at least the portion of the third data stream such that the beginning of the first sub-stream of the first chunk is the fixed interval from the end of the second sub-stream of the first chunk.

In some implementations, generating the fourth data stream can include bit-wise swapping, in the fourth data stream, the second sub-stream of the second chunk with at least the portion of the second data stream such that the beginning of the first sub-stream of the second chunk is the fixed interval from the end of the second sub-stream of the second chunk.

In some implementations, each of the first sub-streams can include information compressed using an entropy-based encoder.

In some implementations, each of the second sub-streams can include uncompressed information.

In some implementations, the first data stream and the second data stream can include information regarding a three-dimensional point cloud.

In another aspect, a method includes obtaining N data streams, where each of the N data streams includes one or more chunks; and generating a combined data stream including the N data streams. Generating the combined data stream includes (i) removing padding data from one or more of the N data streams, (ii) subsequent to removing the padding data, concatenating the N data streams in order from the first data stream to the Nth data stream to produce the combined data stream, and (iii) for each data streams in the combined data stream, in order from the (N−1)th data stream to the first data stream, bit-wise swapping a portion of a trailing chunk of that data stream with at least a portion of the sequentially next data stream in the combined data stream such that in the combined data stream, a beginning of the trailing chunk is a fixed interval from an end of the trailing chunk. The method also includes providing the combined data stream for transmission or storage.

Implementations of this aspect can include one or more of the following features.

In some implementations, the N data streams can include a first data stream, a second data stream, and a third data stream. Generating the combined data stream can include (i) bit-wise swapping a portion of a trailing chunk of the second data stream with at least a portion of the third data stream in the combined data stream such that in the combined data stream, a beginning of the trailing chunk of the second data stream is a fixed interval from an end of the trailing chunk of the second data stream, and (ii) bit-wise swapping a portion of a trailing chunk of the first data stream with at least a portion of the second data stream in the combined data stream such that in the combined data stream, a beginning of the trailing chunk of the first data stream is a fixed interval from an end of the trailing chunk of the first data stream.

In some implementations, each of the chunks can include a first sub-stream and a second sub-stream in a sequence.

In some implementations, each of the first sub-streams can include information compressed using an entropy-based encoder.

In some implementations, each of the second sub-streams can include uncompressed information.

In some implementations, the plurality of data streams can include information regarding a three-dimensional point cloud.

In another aspect, a method includes obtaining a combined data stream comprising a plurality of data streams, and sequentially decoding each of the data streams in the combined data stream. Decoding each of the data streams in the combine data stream includes decoding data from chunks of the data stream until an end-of-an stream signal is identified in the data stream, and flushing a current chunk of the data stream and identifying a start of the sequentially next data stream in the combined data stream.

Implementations of this aspect can include one or more of the following features.

In some implementations, flushing the current chunk of the data stream can include (i) discarding one or more partially decoded bytes of the current chunk, (ii) shifting a portion of the combined data stream to an end of the current chunk, where the portion comprises contents of the combined data stream between a first sub-stream chunk and a second sub-stream chunk of the data stream, and (iii) setting a chunk pointer to point to a start of the shifted portion.

Other implementations are directed to systems, devices, and non-transitory, computer-readable media having instructions stored thereon, that when executed by one or more processors, cause the one or more processors to perform operations described herein.

The details of one or more embodiments are set forth in the accompanying drawings and the description below. Other features and advantages will be apparent from the description and drawings, and from the claims.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be\ described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112(f), for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION

Overview

The present disclosure describes techniques for concatenating data streams. For example, these techniques can be used to concatenate multiple individual data streams into a single combined data stream, such that the combined data stream includes the information from each of the individual data streams.

In some implementations, these techniques can be used to concatenate data streams that include information regarding a three-dimensional point cloud. For example, multiple data streams can include information regarding a portion of or aspect of a three-dimensional point cloud (e.g., information regarding the geometry or occupancy of the three-dimensional point cloud). These data streams can be concatenated into a single combined data stream, such that the combined data stream incudes information regarding a portion of or the entirety of the three-dimensional point cloud.

Further, in some implementations, these techniques can be performed as a part of an encoding or decoding process. For example, information regarding a three-dimensional point cloud can be encoded in multiple individual data streams, and the data streams can be concatenated into a single combined data stream for transmission or storage. The information can be extracted from the combined data stream by parsing the contents of each of the individual data streams contained within the combined data stream, and decoding the contents to obtain the originally encoded information.

In some implementations, the contents of a data stream may be divided into one or more chunks of data. Further, each of the chunks can be limited to a specified length (e.g., such that the chunk cannot exceed that length). In some implementations, this length may be specified as a part of an encoding process (e.g., as a constant or parameter in a standardized encoding process).

If the length of each of several individual data stream is evenly divisible by the specified length of a chunk, each of the chunks in the individual data stream will have the same length (e.g., the specified length). Accordingly, when the individual data streams are concatenated together end to end, the beginning and end of each chunk will occur in regular intervals.

However, if the lengths of at least some of the individual data stream are not evenly divisible by the specified length of a chunk, at least some of the data streams will include an incomplete chunk (e.g., a chunk that is less than the specific length). Accordingly, when the individual data streams are concatenated together end to end, the beginning and end of each chunk may not occur at regular intervals. This may make it more difficult (or in some cases, impossible) to identify the beginning and end of each chunk (e.g., when the data stream is being decoded), absent express signaling information.

The techniques described herein enable data streams of various lengths (including data streams that are not evenly divisible by the specified length of a chunk) without individually signaling the beginning and end of each chunk or the lengths of any individual data streams. These techniques can be beneficial in improving the efficiency by which information is encoded in a data stream. For example, these techniques can reduce the size of a data and/or reduce the computational resources needed to encode and decode a data stream.

Although the examples herein relate to the concatenation of data streams that include information regarding a three-dimensional point cloud, in practice, this technique can be used to concatenate chunk based data streams containing any type of information.

Figure 1:
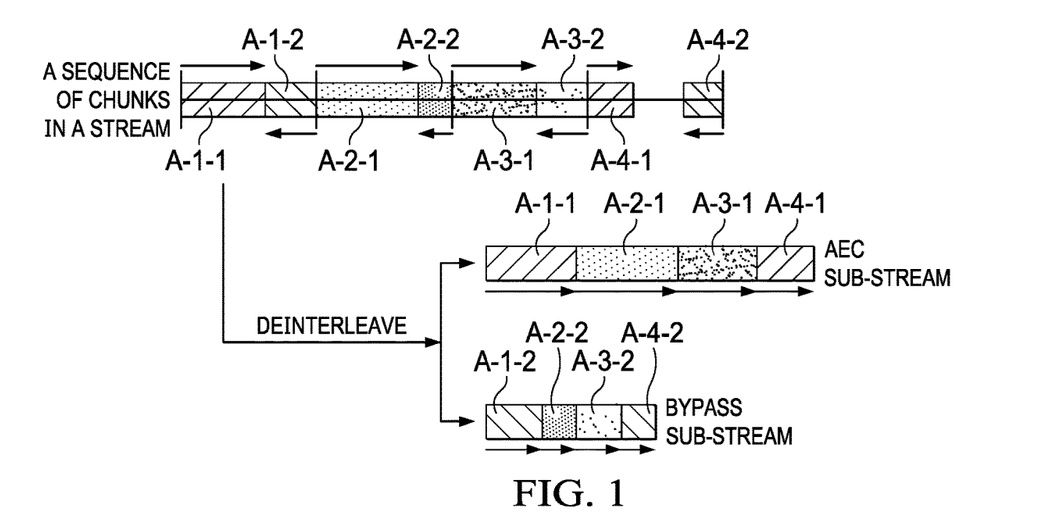
FIG. 1 shows an example data stream.

FIG. 1 shows an example data stream having several chunks. In this example, the data stream is a chunked entropy stream that is a combination of two sub-streams, a sub-stream including compressed information (e.g., an "aec" sub-stream) and a sub-stream included uncompressed information (e.g., a "bypass" sub-stream). These sub-streams are interleaved together in chunks. The order of bytes in the aec sub-stream is the forward order, in the bypass sub-stream it is byte reversed within a chunk (e.g., "reverse" order).

In some implementations, the data stream can be a data stream as described in U.S. Provisional Application No. 62/909,691, filed Oct. 2, 2019, the contents of which are incorporated by reference in their entirety.

In this example, each chunk includes:
A header (1 byte for 256 byte chunks), indicating the length of the forward sub-stream chunk,
A forward sub-stream chunk A-1-1 (including a portion of the aec sub-stream)—may not be present if the chunk only contains a reverse sub-stream chunk, and
An optional reverse sub-stream chunk A-1-2 (including a portion of the bypass sub-stream)—may not be present if the chunk only contains a forward sub-stream chunk. The reverse sub-stream chunk, if present, may contain a header at the end indicating the number of padding bits inserted at the end of the chunk.

In order to reduce inefficiency, if the last chunk is not complete (e.g., is less than a specified length), rather than padding the data to the full chunk length (creating wasted space), a defined truncation process is used.

The truncation process applies to systems where the payload length of the entire stream is known, and the end of the chunked entropy stream is either aligned with the end of the payload, at a fixed offset from the end of the payload, or at an offset from the end of the payload that can be determined.

Figure 2:
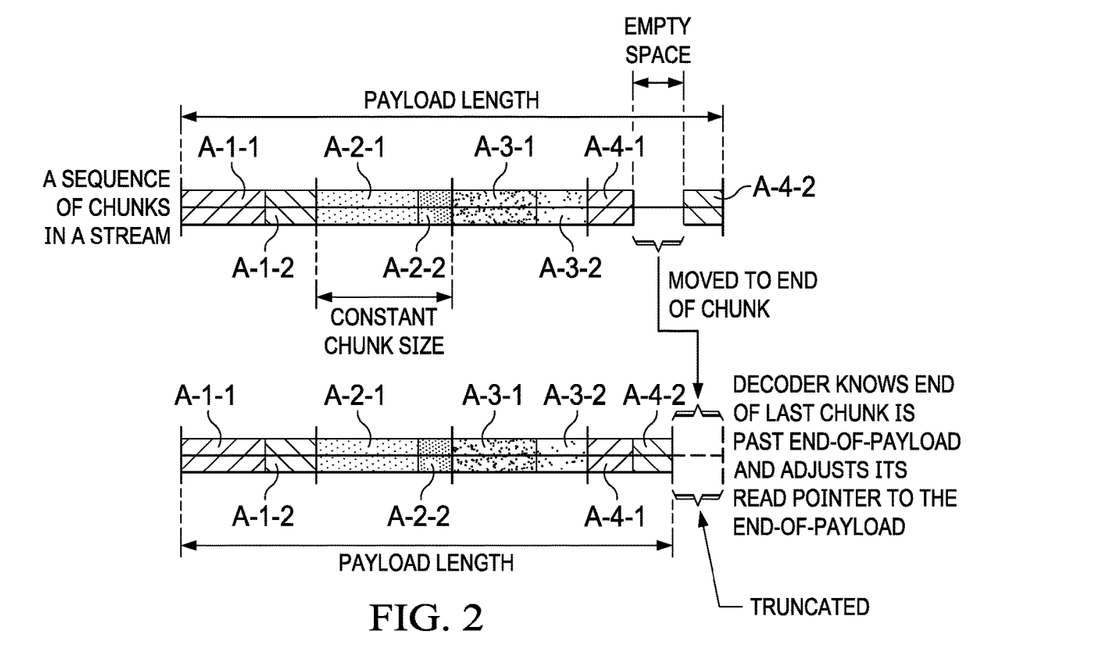
FIG. 2 shows an example process for detecting that a truncation has occurred.

The wasted space from the final chunk is elided. Conceptually, it is moved to the end of the chunk, and the chunk is then truncated. A decoder may detect that truncation has occurred according to the process shown in FIG. 2.

Example Use Case

An encoder may use parallel techniques to encode data. For instance, a geometry encoder, having all data available and therefore with no complex dependencies to resolve, could be constructed to encode multiple levels of an octree geometry representation in parallel.

Figure 3:
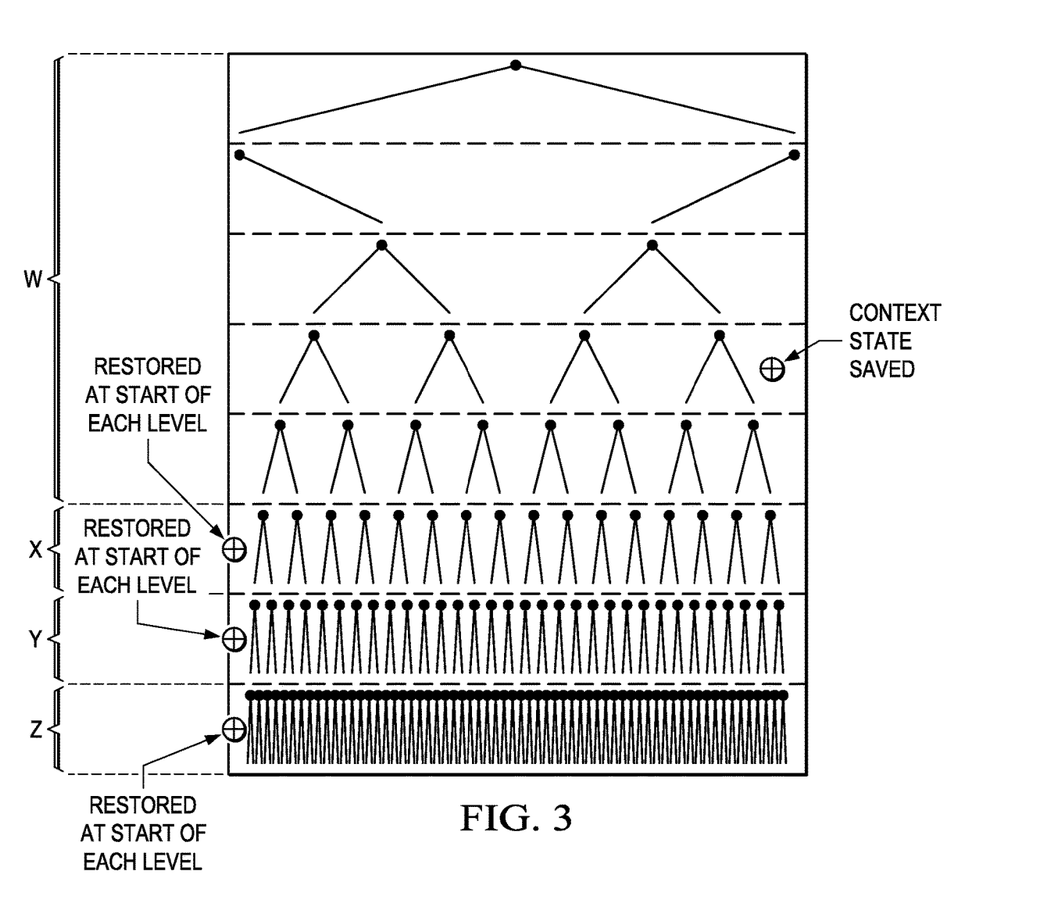
FIG. 3 shows an example octree geometry representation.

For example, as shown in FIG. 3, the levels w, x, y, and z can be encoded in parallel. The result is four entropy streams (e.g., one for each region W-Z). These entropy streams are sent sequentially to a decoder.

If the length of each entropy stream is signaled, the chunked entropy stream truncation process may be used for each stream prior to concatenation. However, if the lengths are not signaled, problems may arise in the processing of the streams (as detailed below).

Example Problem

Figure 4A:
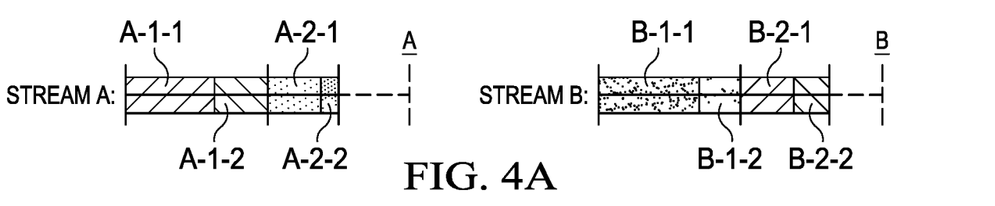
FIGS. 4A-4C show example techniques for concatenating data streams.

FIG. 4A shows two individual chunk streams A and B. The stream A includes chunks A-1 (which includes sub-stream chunks A-1-1 and A-1-2) and A-2 (which includes sub-stream chunks A-2-1 and A-2-2). The stream B includes chunks B-1 (which includes sub-stream chunks B-1-1 and B-1-2) and B-2 (which includes sub-stream chunks B-2-1 and B-2-2). The length of each of chunks A-2 and B-2 is shorter than the specified constant length of a chunk (e.g., as shown by dotted lines).

Figure 4B:
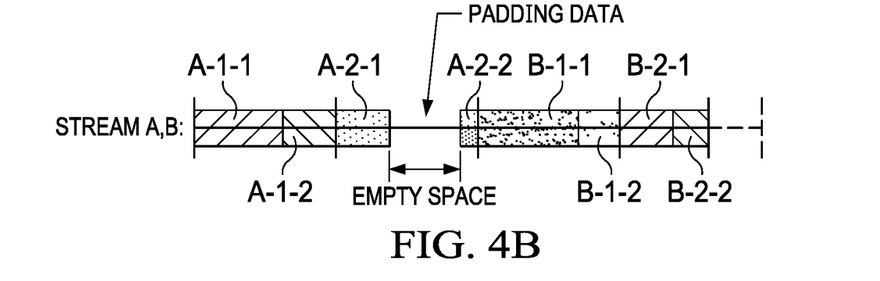

As shown in FIG. 4B, the streams A and B could be concatenated without signaling the length of the stream A by not truncating the final chunk in the stream A (e.g., the chunk A-2). For example, padding data can be inserted between the sub-streams A-2-1 and A-2-2. However, in some implementations this may be wasteful, as the size of the concatenation of the stream A and the stream B would be increased by the addition of the padding data, which does not provide any additional information regarding the subject of the streams A and B.

Figure 4C:
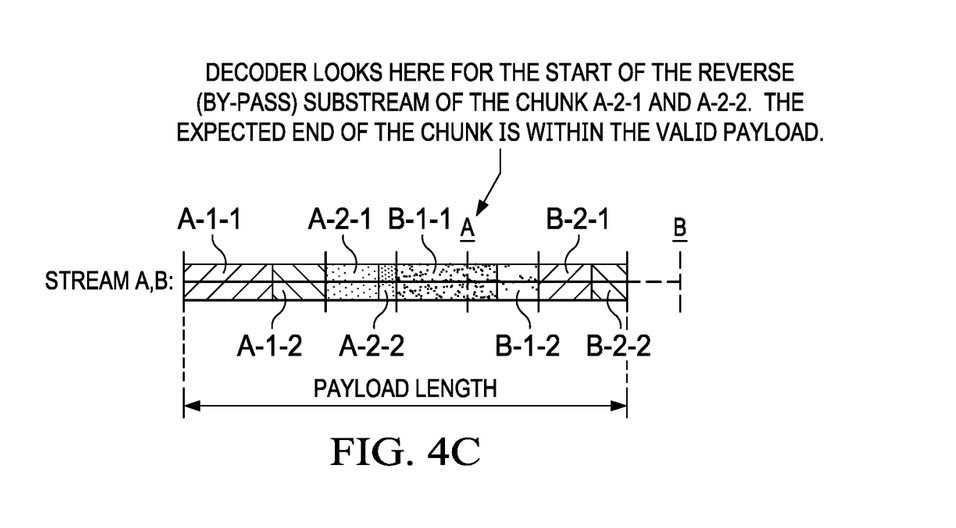

As shown in FIG. 4C, the streams A and B could be concatenated without signaling the length of stream A by simply concatenating stream B to the end of the stream A (e.g., such that the last byte of a chunk corresponds to the first byte of the chunk-reversed bypass stream). However, in this scenario, a decoder would require additional information in order to locate this first byte which is displaced from its expected location.

In some implementations, instead of eliminating the wasted padding space, the padding space can be repurposed. If the first chunk of stream B could be reduced to match the size of the wasted space, then a decoder would (a) know where to start decoding, and (b), when switching to chunk stream (B) would implicitly know the size of the first "runt" chunk. However, while this approach is conceptually simple, this approach involves re-chunking the entirety of stream B, which may also affect buffering guarantees provided by the original chunking.

Example Solution—Merging the Truncated Chunk
(Example with Two Streams)

As an alternative to the techniques shown in FIGS. 4B and 4C, the streams A and B can be concatenated such as the bypass sub-stream component of the last chunk of the stream A (e.g., the sub-stream A-2-2 of the chunk A-2) aligns with the expected end of that chunk (e.g., such that the beginning of the chunk and the end of the chunk are a fixed length or interval from one another).

Figure 5A:
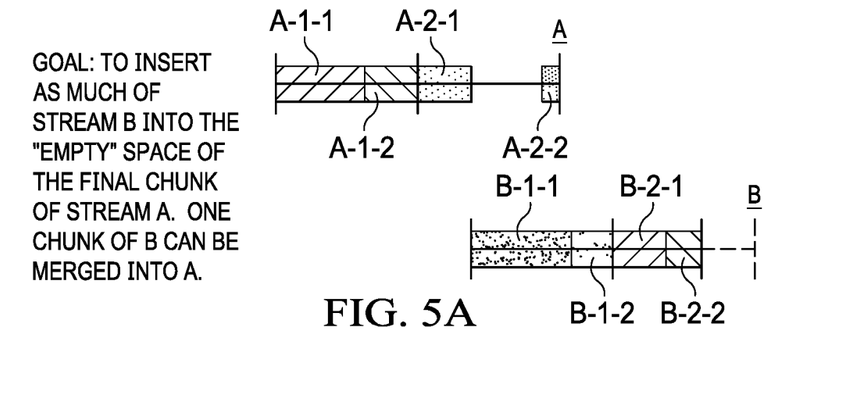
FIGS. 5A and 5B show another example technique for concatenating data streams.
Figure 5B:
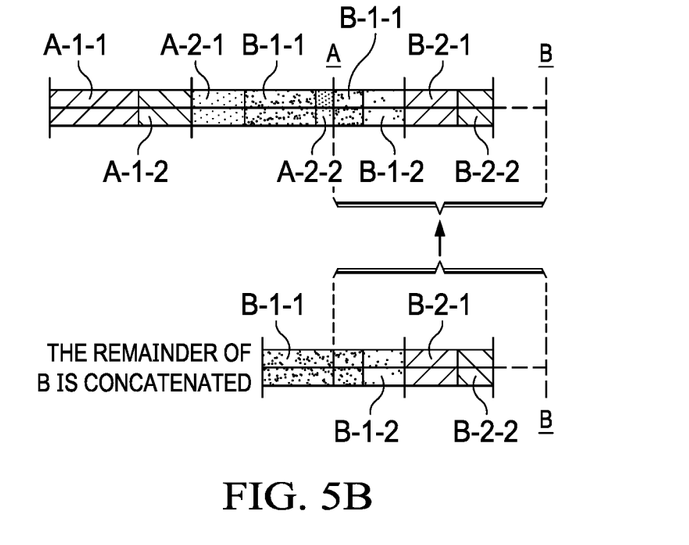

For example, as shown in FIGS. 5A and 5B, part of the initial chunk of the stream B (e.g., the chunk B-1) can be inserted into the empty space in the stream A (e.g., between the sub-streams A-2-1 and A-2-2). The remainder of the stream B can be appended to the end of the stream A (e.g., simple concatenation).

This example is not restricted to the concatenation of two individual chunked data streams. A sequence of individual chunked data streams may be combined in this manner by first applying the merging process to the first two individual chunked data streams, and thereafter recursively applying the merging process to the hitherto combined (accumulated) stream and the next individual chunked data stream to be merged.

However, when merging a sequence of three or more individual chunked data streams, additional steps are required if any of the middle individual chunked data streams (i.e., excluding the first and last individual chunked data streams) are shorter than the a single chunk length.

Example Solution—Merging the Truncated Chunk

In some implementations, an individual chunked data stream may have length that is less than the specified constant length of a chunk. In these situations, multiple chunks may be merged together.

Figure 6:
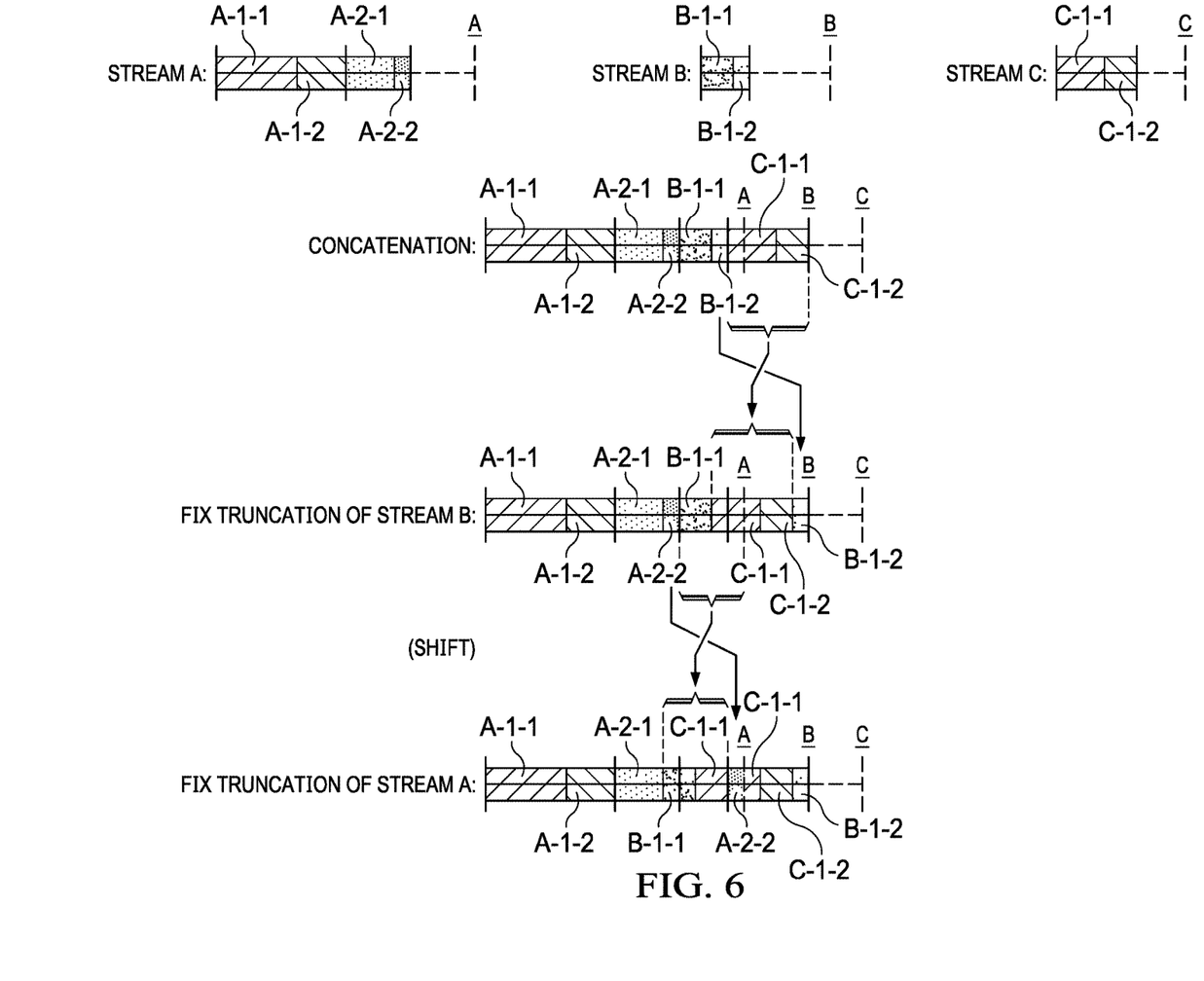
FIG. 6 shows another example technique for concatenating data streams.

As an example, FIG. 6 shows, without loss of generality, three individual chunked data streams A, B, and C. The stream A includes chunks A-1 (which includes sub-stream chunks A-1-1 and A-1-2) and A-2 (which includes sub-stream chunks A-2-1 and A-2-2). The stream B includes chunk B-1 (which includes sub-stream chunks B-1-1 and B-1-2). The stream C includes chunk C-1 (which includes sub-stream chunks C-1-1 and C-1-2). The length of each of streams B and C is shorter than the specified constant length of a chunk (e.g., as shown by dotted lines).

First, the truncated streams A, B, and C can be concatenated, such that the beginning of the stream B is appended to the end of the stream A, and the beginning of the stream C is appended to the end of the stream B, and such that any chunk padding data is discarded (e.g., simple or dumb concatenation).

Then, proceeding from the penultimate stream to the first stream, the last chunk in each stream can be rearranged such that the trailing portion of the chunk (e.g., the bytes of the reverse bypass sub-stream) appears at the expected end of the chunk to compensate for the discarded chunk padding data. This process is not applied to the last stream C since the expected end of the chunk aligns with the end of the payload.

For example, as shown in FIG. 6, the stream B is "fixed" by moving the bytes of the bypass sub-stream B-1-2 to the expected end of the chunk B-1 (marked by a dotted line B), and shifting the intervening bytes backwards. The process is then repeated for the last chunk of stream A (e.g., chunk A-2).

In some implementations, this merging process does not require rewriting any of the intermediate chunks. Therefore it does not add any significant computational burden.

In some implementations, the rearrangement process may be performed during the concatenation process. Each subsequent individual chunked data stream is concatenated with the accumulated output (e.g., a combined data stream). When an individual chunked data stream (for instance, B) is smaller than the required padding data of the last chunk of the accumulated output (for instance, A-2), next individual chunked data streams are concatenated (for instance, C) until sufficient data is accumulated to fill the required padding data. The rearrangement is performed in reverse order as previously described over the affected chunks (B, A). Therefore, it is not necessary that an implementation first performs the dumb concatenation of all individual chunked data streams and then subsequently process the concatenated chunks in reverse order to apply the rearrangement process. As a consequence, the described method does not prohibit low-delay operation modes where initial chunks may be output (eg, A-1) before all processing operations are complete.

As illustrated in FIG. 6, the distance in the output stream between the beginning of B-1-1 and end of B-1-2 exceeds the chunk size due to the shifting of A-2-2. While it may appear to violate the purpose of allowing a decoder to locate the end of B-1 given the start of B-1, it shall be seen that the decoding process can resolve this arrangement.

Without length information for each individual chunked data stream, a decoder cannot perform random access to the start of a particular chunked data stream without first decoding any previous chunked data streams. If such information turns out to be useful to an implementation, it may be retrofitted to a system in the form of supplemental metadata conveyed in a supplemental data unit or packet, or by some other external means.

To decode the information represented by the combined data stream, a decoder must be able to identify when a particular data stream terminates. By way of example, this may be indicated by a flag signaled within the bitstream that marks the termination of the stream (for instance, after a group of nodes in an octree, or at the end of each octree layer), or from some implicit process without signaling an explicit flag (for instance, at the end of every octree level, or after the completion of specific octree levels).

In some implementations, a decoder maintains a single uniform buffer of input data. Two pointers may be used to mark a current position in each sub-stream within the buffer (the forward sub-stream chunk position CurPosF, and reverse sub-stream chunk position CurPosR). Two additional pointers may be used to mark a start position of a next chunk for each of the respective sub-streams (NextChunkF, NextChunkR). Two length counters may be used to indicate the amount of data remaining in the current sub-stream chunk for each of the respective sub-streams (RemF, RemR). Other decoding processes also can be performed, either instead of or in addition to those described herein.

With reference to FIG. 6, decoding commences from the start of the concatenated data stream (i.e. a first data stream). Chunks are parsed (A-1, A-2) and decoded until the decoder detects the completion (termination) of the parsed data in the data stream. For the final chunk A-2 of A, the decoder naturally finds the start of the reverse sub-stream chunk A-2-2. Once completion is detected, the current chunk A-2 must be flushed and the decoder prepared for parsing of a next second data stream.

The decoder chunk flushing process consists of
 1. Discarding any partially parsed byte from each of the two respective sub-stream chunks. The length of A-2-2 is now known by the decoder, NextChunkR—CurPosR, (or equivalently as the chunk length minus one, less the indicated forward sub-stream chunk length, less RemR).

2. Applying the inverse rearrangement process. The completed A-2-2 is discarded, and the intervening bytes between the end of A-2-1 and beginning of A-2-2 are shifted right by the length of A-2-2.
3. Setting the pointer locations to the first chunk of a next second data stream B. NextChunkF and NextChunkR are both set to the start of B-1 (coincident with B-1-1), which is equivalent to CurPosF plus the length of the discarded A-2-2.
4. The parsing of B commences. The decoder can locate the end of B-1 to identify the start of the reverse sub-stream B-1-1 since end of B-1 is at a known distance from the start of B-1.

In some implementations, a decoder may use one or more intermediate buffers to demultiplex each chunk.

Figure 7:
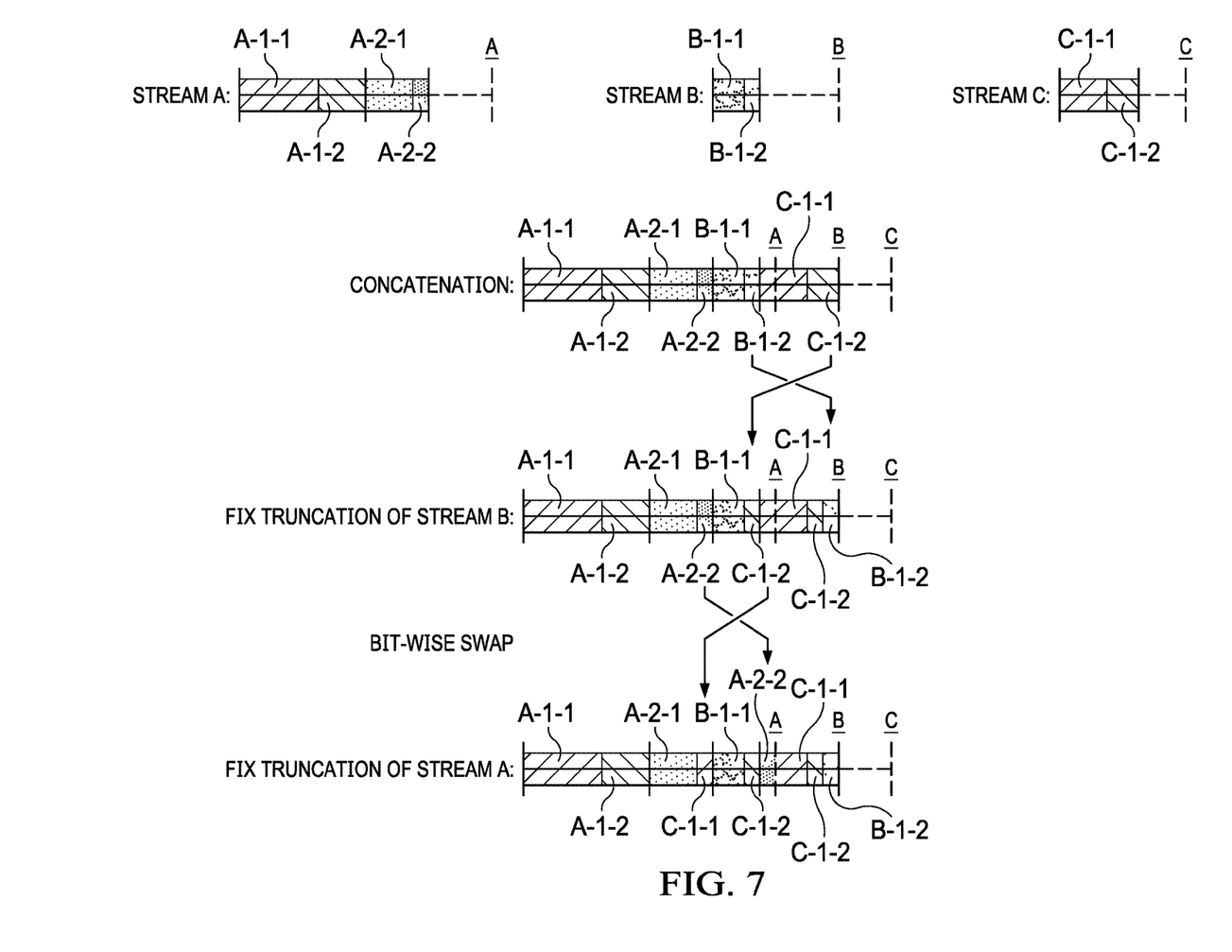
FIG. 7 shows another example technique for concatenating data streams.

In some implementations, instead of displacing the intermediate bytes when shifting the trailing portion of a chunk (e.g., the bytes of the bypass sub-stream), an alternative is to perform a byte-wise swapping of the end of the chunk with the desired end data. An example of this technique is show in FIG. 7. The decoding process is similar to what is previously described, except that the inverse swapping process is performed instead of the shifting based rearrangement.

Example Solution—Chunk Splitting

In some implementations, two streams A and B can be concatenated by an alternative processing of the first chunk of the stream B. As before, the streams A and B can be concatenated such as the bypass sub-stream component of the last chunk of the stream A (e.g., the sub-stream A-2-2 of the chunk A-2) aligns with the expected end of that chunk (e.g., such that the beginning of the chunk and the end of the chunk are a fixed length or interval from one another).

Figure 8:
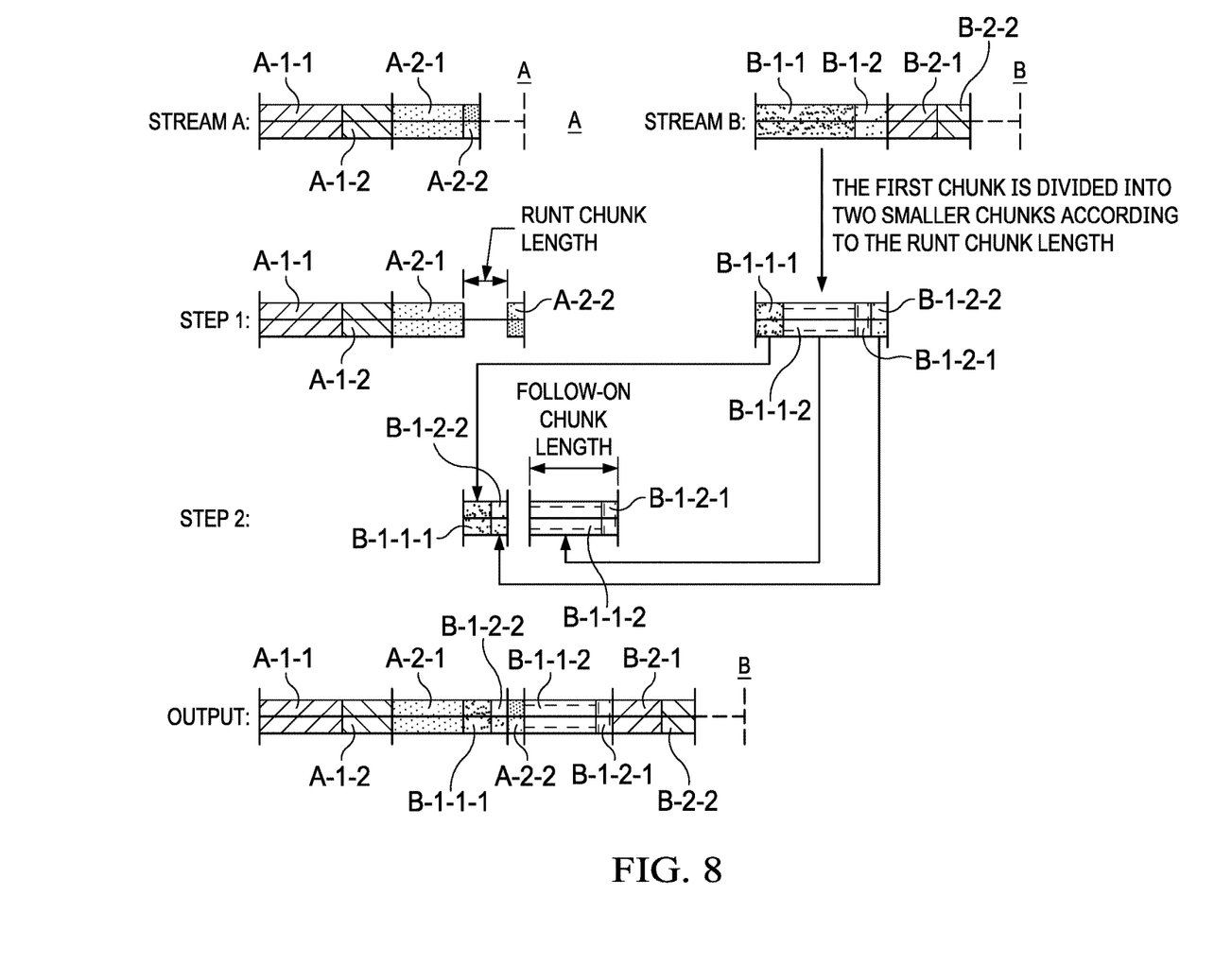
FIG. 8 shows another example technique for concatenating data streams.

As shown in FIG. 8, this can be performed by dividing the first chunk of the stream B (e.g., the chunk B-1) into two new chunks, a runt-chunk (e.g., chunks B-1-1-1 and B-1-2-2) that is merged into the final chunk of A (e.g., between the sub-streams A-2-1 and A-2-2), and a follow-on chunk (e.g., chunks B-1-1-2 and B-1-2-1) that immediately follows the stream A.

The chunk size for the first runt chunk is equal to the padding length (see "runt chunk length"). The follow-on chunk size is:

followingChunkSize=chunkHeaderSize+systemChunkSize−runtChunkSize+runtChunkPaddingHeaderSize, where runtChunkPaddingHeaderSize is equal to 1 if the runtChunk contains a reverse sub-stream chunk padding header, otherwise it is equal to 0, and where chunkHeaderSize is the length of the chunk header indicating the length of the forward sub-stream chunk. A chunk splitting system has a coding efficiency cost due to the signaling of an extra chunk header and padding header arising from each chunk that is splitting into two.

Figure 9:
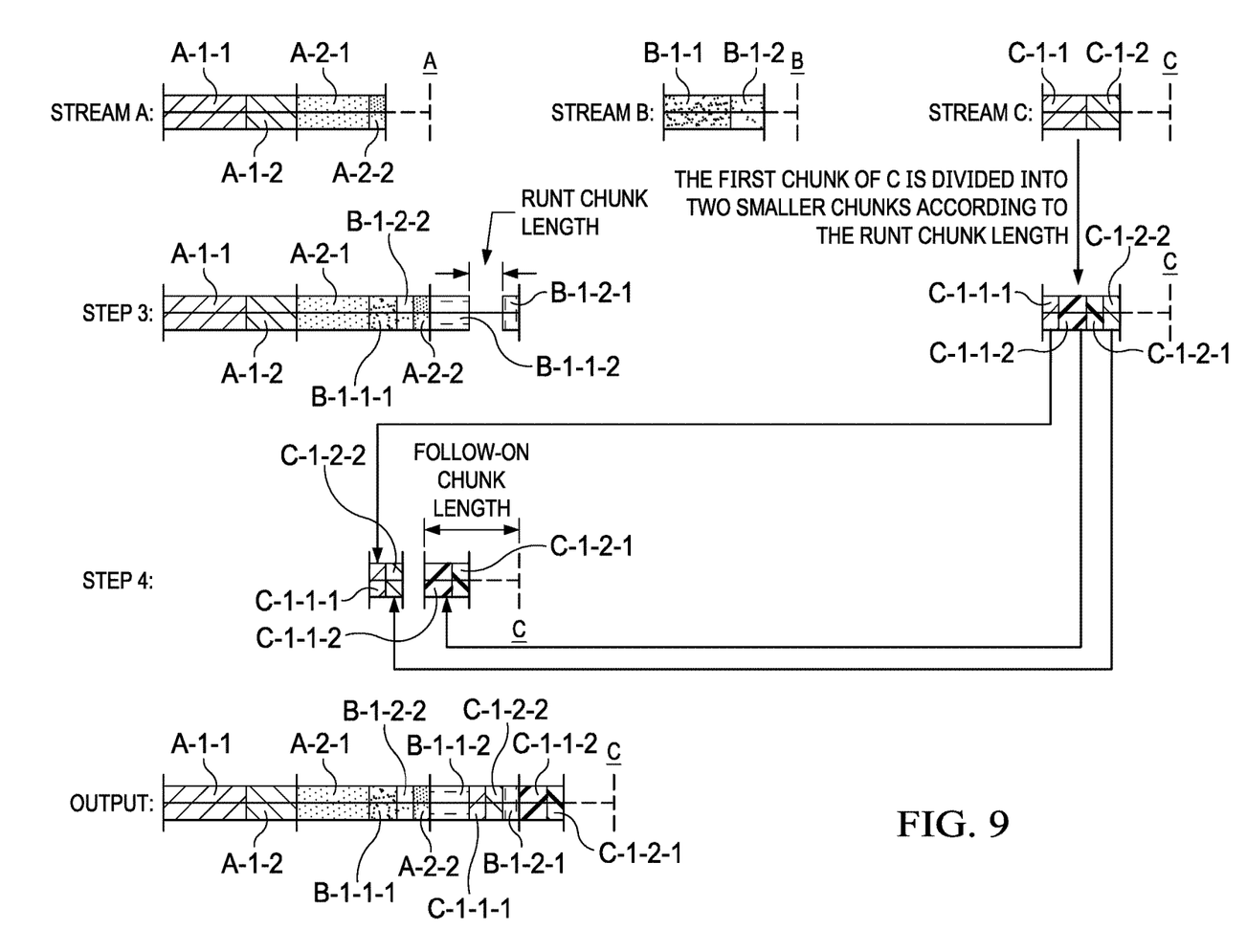
FIG. 9 shows another example technique for concatenating data streams.

This process may be applied sequentially to combine more than two streams. For instance, FIG. 9 shows an example combination of three streams A, B, and C. The steps 1 and 2 are similar to those shown in FIG. 8.

Figure 10:
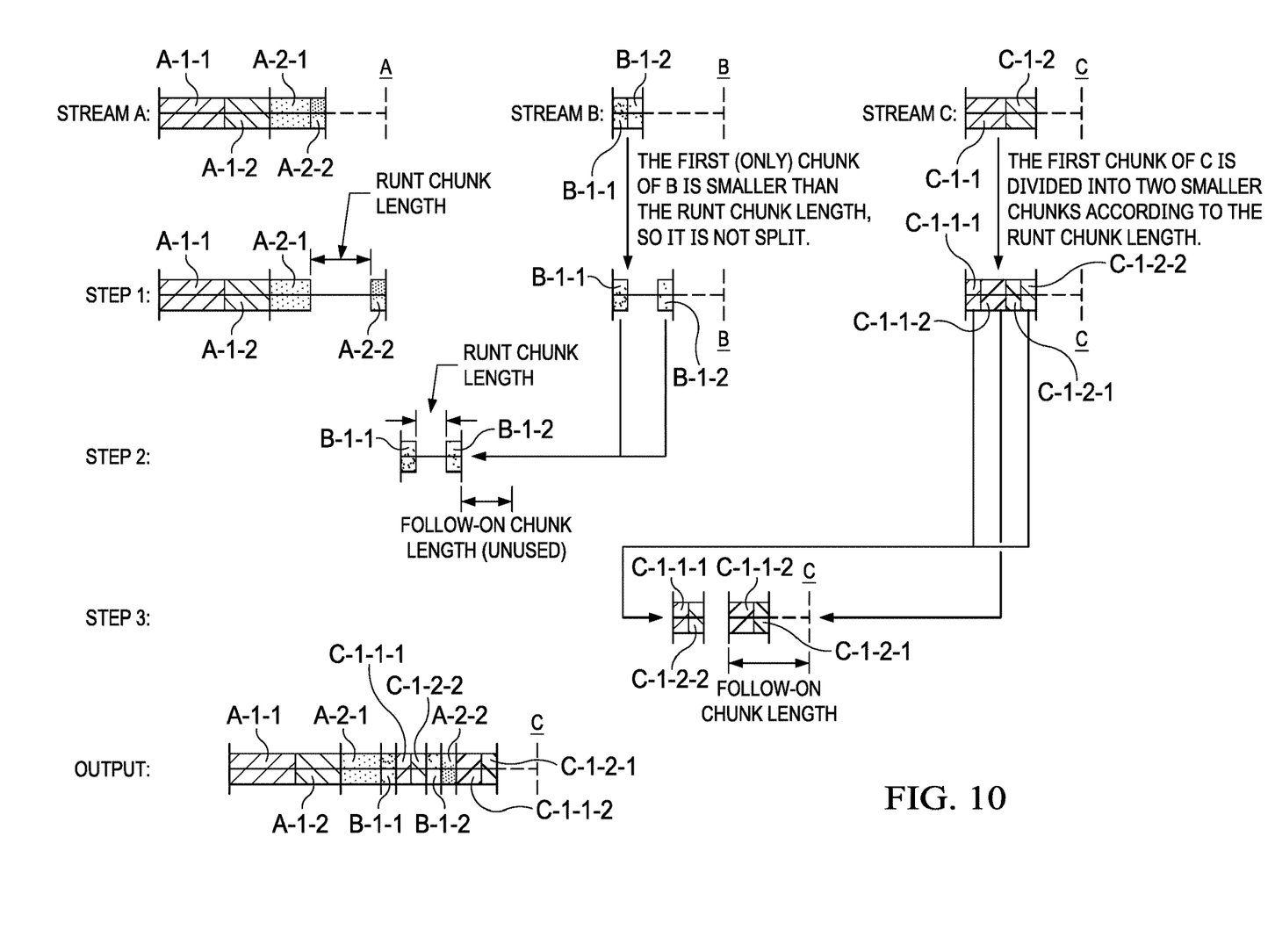
FIG. 10 shows another example technique for concatenating data streams.

Further, FIG. 10 shows another example combination of three streams A, B, and C, where the stream B is smaller than the runt chunk.

Example Decoding Process

An example decoding process is described below with reference to FIG. 8.

Step 1. The chunk size is set to the system steady state chunk size (e.g., 256).

Step 2. The parsing of a chunk proceeds.

If the decoder determines that the stream has ended go to Step 1, otherwise go to Step 2. This may be due to an explicit indication in the bitstream such as a flag indicating that the current entropy stream terminates, or may be implicitly determined by, for example, reaching the end of parsing a level of the octree.

Step 3. At the end of the stream (A-2), the current chunk is flushed. Any buffered forward stream (A-2-1) bytes are discarded, the flushing process consumes the reverse stream (A-2-2) padding byte (if present). The chunk read pointer is advanced to the end of the forward sub-stream chunk. The runt chunk length is determined by accounting for the number of bytes present in the flushed chunk.

Step 4. The chunk size is set to the runt chunk size (from the start of B-1-1-1 to the end of B-1-2-2), and parsing resumes with the runt chunk.

If the decoder determines that the stream has ended go to Step 3, otherwise go to Step 2. This may be due to an explicit indication in the bitstream such as a flag indicating that the current entropy stream terminates, or may be implicitly determined by, for example, reaching the end of parsing a level of the octree.

Step 5. At the end of the runt chunk (B-1-2-2), the chunk size is set to the follow-on chunk size (from the start of B-1-1-2 to the end of B-1-2-1), and parsing resumes with the follow-on chunk.

If the decoder determines that the stream has ended go to Step 3, otherwise go to Step 2. This may be due to an explicit indication in the bitstream such as a flag indicating that the current entropy stream terminates, or may be implicitly determined by, for example, reaching the end of parsing a level of the octree.

Step 6. At the end of the follow-on chunk, go to Step 1 (B-2).

Example Computer System

Figure 11:
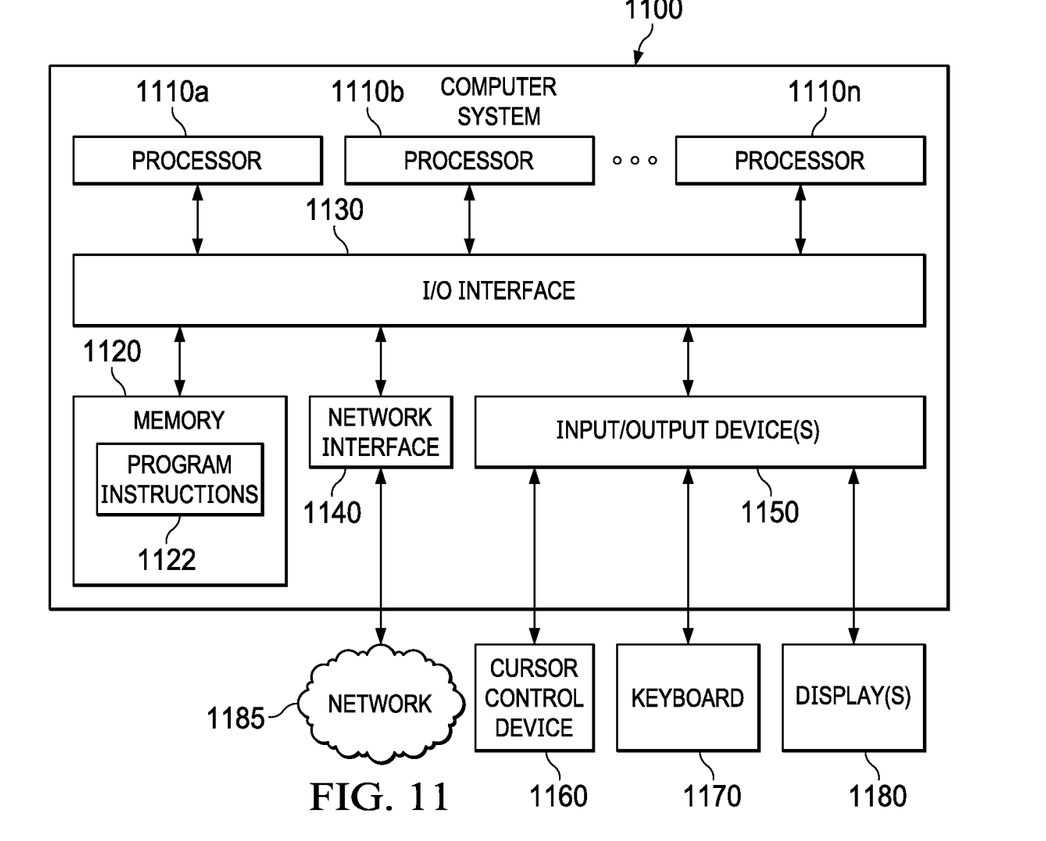
FIG. 11 illustrates an example computer system that may implement an encoder or decoder.

FIG. 11 illustrates an example computer system 1100 that may implement an encoder or decoder or any other ones of the components described herein. The computer system 1100 may be configured to execute any or all of the embodiments described above. In different embodiments, computer system 1100 may be any of various types of devices, including, but not limited to, a personal computer system, desktop computer, laptop, notebook, tablet, slate, pad, or netbook computer, mainframe computer system, handheld computer, workstation, network computer, a camera, a set top box, a mobile device, a consumer device, video game console, handheld video game device, application server, storage device, a television, a video recording device, a peripheral device such as a switch, modem, router, or in general any type of computing or electronic device.

Various embodiments of a point cloud encoder or decoder, as described herein may be executed in one or more computer systems 1100, which may interact with various other devices. Note that any component, action, or functionality described above with respect to FIGS. 1-10 may be implemented on one or more computers configured as computer system 1100 of FIG. 10, according to various embodiments. In the illustrated embodiment, computer system 1100 includes one or more processors 1110 coupled to a system memory 1120 via an input/output (I/O) interface 830. Computer system 1100 further includes a network interface 1140 coupled to I/O interface 1130, and one or more input/output devices 1150, such as cursor control device 1160, keyboard 1170, and display(s) 1180. In some cases, it is contemplated that embodiments may be implemented using a single instance of computer system 1100, while in other embodiments multiple such systems, or multiple nodes making up computer system 1100, may be configured to host different portions or instances of embodiments. For example, in one embodiment some elements may be implemented via one or more nodes of computer system 1100 that are distinct from those nodes implementing other elements.

In various embodiments, computer system 1100 may be a uniprocessor system including one processor 1110, or a multiprocessor system including several processors 1110 (e.g., two, four, eight, or another suitable number). Processors 810 may be any suitable processor capable of executing instructions. For example, in various embodiments processors 1110 may be general-purpose or embedded processors implementing any of a variety of instruction set architectures (ISAs), such as the x86, PowerPC, SPARC, or MIPS ISAs, or any other suitable ISA. In multiprocessor systems, each of processors 810 may commonly, but not necessarily, implement the same ISA.

System memory 1120 may be configured to store point cloud compression or point cloud decompression program instructions 1122 and/or sensor data accessible by processor 1110. In various embodiments, system memory 1120 may be implemented using any suitable memory technology, such as static random access memory (SRAM), synchronous dynamic RAM (SDRAM), nonvolatile/Flash-type memory, or any other type of memory. In the illustrated embodiment, program instructions 1122 may be configured to implement an image sensor control application incorporating any of the functionality described above. In some embodiments, program instructions and/or data may be received, sent or stored upon different types of computer-accessible media or on similar media separate from system memory 1120 or computer system 1100. While computer system 1100 is described as implementing the functionality of functional blocks of previous Figures, any of the functionality described herein may be implemented via such a computer system.

In one embodiment, I/O interface 1130 may be configured to coordinate I/O traffic between processor 1110, system memory 1120, and any peripheral devices in the device, including network interface 1140 or other peripheral interfaces, such as input/output devices 1150. In some embodiments, I/O interface 1130 may perform any necessary protocol, timing or other data transformations to convert data signals from one component (e.g., system memory 1120) into a format suitable for use by another component (e.g., processor 1110). In some embodiments, I/O interface 1130 may include support for devices attached through various types of peripheral buses, such as a variant of the Peripheral Component Interconnect (PCI) bus standard or the Universal Serial Bus (USB) standard, for example. In some embodiments, the function of I/O interface 1130 may be split into two or more separate components, such as a north bridge and a south bridge, for example. Also, in some embodiments some or all of the functionality of I/O interface 1130, such as an interface to system memory 1120, may be incorporated directly into processor 1110.

Network interface 1140 may be configured to allow data to be exchanged between computer system 1100 and other devices attached to a network 1185 (e.g., carrier or agent devices) or between nodes of computer system 1100. Network 1185 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 1140 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1150 may, in some embodiments, include one or more display terminals, keyboards, keypads, touchpads, scanning devices, voice or optical recognition devices, or any other devices suitable for entering or accessing data by one or more computer systems 1100. Multiple input/output devices 1150 may be present in computer system 1100 or may be distributed on various nodes of computer system 1100. In some embodiments, similar input/output devices may be separate from computer system 800 and may interact with one or more nodes of computer system 1100 through a wired or wireless connection, such as over network interface 1140.

As shown in FIG. 11, memory 1120 may include program instructions 1122, which may be processor-executable to implement any element or action described above. In one embodiment, the program instructions may implement the methods described above. In other embodiments, different elements and data may be included. Note that data may include any data or information described above.

Those skilled in the art will appreciate that computer system 1100 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 1100 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 800 may be transmitted to computer system 800 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer accessible medium.

Generally speaking, a computer-accessible medium may include a non-transitory, computer-readable storage medium or memory medium such as magnetic or optical media, e.g., disk or DVD/CD-ROM, volatile or non-volatile media such as RAM (e.g., SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A method comprising:
    obtaining a first data stream and a second data stream, wherein each of the first data stream and the second data stream comprises one or more chunks, wherein each of the chunks comprises a first sub-stream and a second sub-stream in a sequence;
    generating a third data stream comprising the first data stream and the second data stream, wherein generating the third data stream comprises:
        inserting, in the third data stream, at least a portion of a first chunk of the second data stream between a beginning and an end of a second chunk of the first data stream,
        wherein in the third data stream, at least the portion of the first chunk of the second data stream is inserted between the first sub-stream and the second sub-stream of the second chunk of the first data stream; and
    providing the third data stream for transmission or storage.

2. The method of claim 1, wherein the first chunk of the second data stream is positioned at a beginning of the second data stream.

3. The method of claim 1, wherein the second chunk of the first data stream is positioned at an end of the first data stream.

4. The method of claim 1, wherein generating the third data stream comprises:
    appending, in the third data stream, a remainder of the second data stream to an end of the first data stream.

5. The method of claim 1, wherein each of the first sub-streams of data comprises information compressed using an entropy-based encoder.

6. The method of claim 5, wherein each of the second sub-streams of data comprises uncompressed information.

7. The method of claim 1, wherein the first data stream and the second data stream comprise information regarding a three-dimensional point cloud.

8. A device comprising:
    one or more processors; and
    memory storing instructions that when executed by the one or more processors, cause the one or more processors to perform operations comprising:
        obtaining a first data stream and a second data stream, wherein each of the first data stream and the second data stream comprises one or more chunks, wherein each of the chunks comprises a first sub-stream and a second sub-stream in a sequence;
        generating a third data stream comprising the first data stream and the second data stream, wherein generating the third data stream comprises:
            inserting, in the third data stream, at least a portion of a first chunk of the second data stream between a beginning and an end of a second chunk of the first data stream,
            wherein in the third data stream, at least the portion of the first chunk of the second data stream is inserted between the first sub-stream and the second sub-stream of the second chunk of the first data stream; and
        providing the third data stream for transmission or storage.

9. One or more non-transitory, computer-readable storage media having instructions stored thereon, that when executed by one or more processors, cause the one or more processors to perform operations comprising:
    obtaining a first data stream and a second data stream, wherein each of the first data stream and the second data stream comprises one or more chunks, wherein each of the chunks comprises a first sub-stream and a second sub-stream in a sequence;
    generating a third data stream comprising the first data stream and the second data stream, wherein generating the third data stream comprises:
        inserting, in the third data stream, at least a portion of a first chunk of the second data stream between a beginning and an end of a second chunk of the first data stream,
        wherein in the third data stream, at least the portion of the first chunk of the second data stream is inserted between the first sub-stream and the second sub-stream of the second chunk of the first data stream; and
    providing the third data stream for transmission or storage.

* * * * *